United States Patent [19]
Wheeler et al.

[11] Patent Number: 5,545,336
[45] Date of Patent: Aug. 13, 1996

[54] METHOD OF NEUTRALIZING ALDEHYDE-CONTAINING WASTE WATERS AND THE LIKE

[76] Inventors: Steven P. Wheeler, 1821 Valleta Dr., Torrance, Calif. 90275; Theodore R. Bryan, 125 N. Starflower St., Brea, Calif. 92621

[21] Appl. No.: 538,530

[22] Filed: Oct. 3, 1995

[51] Int. Cl.$^6$ ............................................. C02F 1/70
[52] U.S. Cl. ................................. 210/757; 210/908
[58] Field of Search .......................... 210/749, 757, 210/758, 908

[56] References Cited

U.S. PATENT DOCUMENTS

| | | | |
|---|---|---|---|
| 3,909,408 | 9/1975 | Ishida et al. | 210/757 |
| 5,380,444 | 1/1995 | Ryan et al. | 210/734 |

*Primary Examiner*—Neil McCarthy
*Attorney, Agent, or Firm*—John J. Posta, Jr.

[57] ABSTRACT

The present method is capable of completely neutralizing the aldehydes in aldehydic waste waters within about 15 minutes and of producing a non-toxic waste water which then can be disposed of without fear of contamination of drain lines, etc. The method is carried out by contacting aldehyde-containing waste water with a sufficient amount of sodium pyrosulfite to completely neutralize the aldehydes in the waste water within about 15 minutes to non-toxic substances. The contacting is initiated without first adjusting the pH of the waste water and is maintained during the treatment period with agitation of the waste water being treated to assure full neutralization of all parts thereof. The sodium pyrosulfite and its reaction products are non-toxic. No hazard label is required for the sodium pyrosulfite, in contrast to certain conventional waste treating chemicals. The sodium pyrosulfite is a white crystalline powder easily stored, handled, weighed out and used without danger. The sodium pyrosulfite does not generate poisonous gasses, in contrast to sodium bisulfite which off-gasses sulfur dioxide when it is contacted with an acidic environment. The treated waste water in the present method has a pH of about 6–9 and usually is about pH 7 and is ready for disposal without safety precautions.

7 Claims, No Drawings

METHOD OF NEUTRALIZING ALDEHYDE-CONTAINING WASTE WATERS AND THE LIKE

BACKGROUND OF THE INVENTION

1. Field of the Invention

The present invention generally relates to the treatment of waste waters and the like and more particularly to an improved method of neutralizing aldehyde-containing waste waters.

2. Prior Art

Various methods have been used to treat aqueous wastes containing aldehydes in order to neutralize the aldehydes so that the aqueous wastes can then be disposed of without danger to the environment. One such aldehyde frequently encountered is formaldehyde.

Formaldehyde is extensively used in disinfectants and fixatives, usually in 10% aqueous solution in medical facilities. It has also found wide industrial usage as a germicide and embalming fluid. It is also used in the manufacture of artificial silk and other textile fibers, latex, phenolic resins, thiourea resins, malamine resins, dyes, inks, cellulosic esters, mirrors, explosives, etc. It is used in the paper, photographic and furniture industries and as an intermediate in drug and pesticide manufacture.

Waste waters from such processes usually contain appreciable amounts of unreacted formaldehyde, which is a very toxic substance, capable of causing respiratory and digestive disorders and possibly producing carcinogenic effects. Detoxification of those waste waters by neutralizing the formaldehyde is required before the waste waters can be disposed of. Such waste waters typically have an up to about 10 volume % concentration of formaldehyde and a pH of about 2–11.

One conventional process for neutralizing formaldehyde-containing waste waters is set forth in U.S. Pat. No. 3,909,408. The treating agent used is a mixture of sodium sulfite and sodium bisulfite, the latter having the chemical formula $NaHSO_3$. Such sodium bisulfite by itself has been found to be relatively ineffective as an aldehyde neutralizer, as has sodium sulfite by itself. The process of the patent employs a mixture of these two chemicals for supposedly an improved result. However, that mixture varies, depending on the pH of the waste water to be treated and requires careful attention to details in order to make it work.

One of the problems with the process of the patent is that the sodium bisulfite employed in the patented process produces a hazardous substance, namely, sulfur dioxide, under certain processing conditions, so that the process is complicated and somewhat difficult to carry out successfully. The process employs a step where either the pH of the waste water is initially adjusted, preferably to up to about pH 11, to prevent dangerous off-gassing and/or the relative proportions of its reagents are adjusted.

Therefore, there remains a need for a simple method which has improved efficiency in rapidly and completely neutralizing aldehydes in waste waters and which can eliminate pH adjustment of the waste water before its neutralization, but still can provide a totally aldehyde-neutralized waste water product which is non-toxic and has a pH of about 6–9, usually about 7 and therefore can be disposed of into a sewage drain line without having to adjust the pH. Moreover, such method should employ a treating agent which is easy and safe to store, handle, weigh out and use and which does not off-gas a toxic gaseous product.

SUMMARY OF THE INVENTION

All the foregoing needs are satisfied by the improved method of the present invention. The method is substantially as set forth in the ABSTRACT OF THE DISCLOSURE. Thus, a method is disclosed which essentially completely neutralizes aldehydes in waste waters from initial concentrations as high as about 10 volume or weight percent to below about 100 parts per million within about 15 minutes so that the treated waste water can be safely disposed of through a sanitary waste sewer or the like.

The method comprises contacting aldehyde-containing waste water having an initial pH of about 2–11 and usually about pH 6–9 in a batch mode with a sufficient amount of sodium pyrosulfite to essentially completely neutralize the aldehyde and convert it to a plurality of innocuous liquid products dissolved in the waste water.

The sodium pyrosulfite is added as a dry white crystalline powder to the batch of waste water containing the aldehyde, after which the batch is stirred or otherwise agitated for about 10–15 seconds, that is, until the powder is uniformly dissolved in the waste water, after which the batch then can be capped and allowed to stand for about 15 minutes. The batch can be at any suitable temperature, preferably about room temperature or about 60–80 degrees F. and at atmospheric pressure.

By the end of that treating time, the aldehydes in the batch of waste water have been essentially completely neutralized and the waste water is at about pH 6–9, is clear white and single phase with no precipitated solids, such as polymers. The treated waste water has an aldehyde content of less than about 100 parts per million and usually less than about 20 parts per million and can be safely disposed of through a sewer drain or the like without adjusting the pH or taking any special precautions.

Further details of the improved method of the present invention, its steps and parameters are set forth in the following detailed description.

DETAILED DESCRIPTION

The treating agent in the improved method of the present invention consists of sodium pyrosulfite, also known as sodium meta bisulfite. It has the chemical formula $Na_2S_2O_5$, is white crystalline, water-soluble powder and is readily available commercially. It is to be distinguished from sodium bisulfite which has the chemical formula $NaHSO_3$ and which in the past has been used unsuccessfully to treat aldehydic waste waters.

As is set forth in U.S. Pat. No. 3,909,408 and in other patent and literature sources, sodium bisulfite generates toxic sulfur dioxide gas during reaction with aldehydic waste waters and its reaction with aldehydes never goes to completion. This is also the case when sodium sulfite is used as the treating agent. In such event, the sulfite reacts with the aldehydes to form alkalies which cause the reaction medium to become strongly basic, inhibiting the reaction.

When a mixture of sulfite and bisulfite is used, as in the process set forth in U.S. Pat. No. 3,909,408, other problems arise. Either the ratio between the sulfite and bisulfite must be adjusted, depending on the pH of the medium being treated, or the pH itself must be adjusted in order for the desired reaction to take place. This requires testing the waste water for pH before and/or during treatment. The process is complicated and time-consuming and has a large margin for error.

In contrast, the present method is utilizable without requiring pH adjustment of the batch of waste water to be treated, for the normal range of waste waters encountered. The present method works satisfactorily on waste waters which initially have pHs in the range of about 2–9 and the finished treated waste waters will be within the acceptable pH range for safe discharge through a sewer line, that is, about pH 6–9 and usually close to neutral pH.

In accordance with the present method, the aldehyde-containing waste water is passed to a batch treating vessel and is then reacted with the sodium pyrosulfite at about room temperature and atmospheric pressure or the like. The sodium pyrosulfite is poured as a white crystalline powder into the batch treating vessel in a sufficient concentration to assure essentially complete reaction with the aldehydes in the waste water in the vessel. This concentration is determined by experience and/or by testing the waste water for aldehyde concentration by any standard test method. For example, ASTM method D-2194-93, well-known in the literature, can be used or an equivalent method, before the treatment in accordance with the present method begins in the batch treating vessel. Normally, the formaldehyde content of waste waters containing the same is usually up to about 10 volume percent. The usual concentration of glutaraldehyde in waste waters containing the same is up to about 4.5 volume percent.

If desired, essentially complete neutralization of the aldehydes in the waste waters by the method of the present invention can be confirmed after treatment of the waste water, by any suitable conventional method such as EPA method 8315.

After the pyrosulfite is poured into the waste water to be treated, vigorous stirring or other agitation is carried out, preferably for about 10–15 seconds, to assure that the sodium pyrosulfite dissolves and is uniformly distributed to all parts of the waste water to be treated. The batch vessel can then be capped to prevent escape of noxious aldehyde fumes while the waste water is allowed to stand for about 15 minutes, that is, until the reaction between the aldehydes and the sodium pyrosulfite is complete.

The treated waste water is now in the pH range of about 6–9 and usually close to neutral pH and the aldehydes have been reduced in concentration to below about 100 parts per million, usually below about 20 parts per million. The treated waste water can be drained from the batch vessel and disposed of through a sewer line or the like with safety.

It is preferred to utilize a non-reactive conventional buffer with the treating agent during the neutralization reaction in the batch treating vessel. Such buffer can be, for example, any one or more of the following: any inorganic or organic compound or combinations of, that resists changes in pH from addition of acid or base. For example, a mixture of sodium carbonate and sodium hydroxide, sodium dihydrogen phosphate, trisodium phosphate, glycine and sodium hydroxide, potassium hydrogen phthalate, tris(hydroxymethyl) aminomethane, sodium bicarbonte, borax, sodium acetate, sodium citrate, disodium citrate, etc.

The following specific examples further illustrate certain features of the method of the present invention:

EXAMPLE I

Waste water in a volume of about 2 gallons and having an initial concentration of formaldehyde of about 4.26 weight percent and a pH of about 6.5 is passed into a five gallon batch treating vessel and reacted therein at about 70 degrees F. and at atmospheric pressure with a sufficient amount of sodium pyrosulfite, specifically 1354 gms. thereof to essentially completely neutralize the formaldehyde in the waste water. A buffer, specifically trisodium phosphate is also added to the batch vessel in 136 gm. amount.

The sodium pyrosulfite and the buffer are added to the batch vessel after the waste water is present and the mixture is stirred vigorously for about 15 seconds until the sodium pyrosulfite and buffer are dissolved and uniformly distributed to all parts of the waste water in the batch vessel. The vessel is then capped and allowed to stand about 15 minutes. By then the neutralization of the formaldehyde is essentially complete, 99.995 percent of the formaldehyde having been neutralized so that its concentration is below about 20 parts per million. The reaction which occurs in the batch vessel is as follows:

$3CH_2O + Na_2S_2O_5$ + buffer yields $Na_2CS_2O_8$ which is sodium methylene bisulfate + $NaCH_3SO_4$ which is sodium hydroxylmethane sulfite + $NaCHO_2$ which is sodium formate + $Na_2SO_4$ which is sodium sulfate plus other chemical species.

The reaction indicated above proceeds rapidly to completion without any need to adjust the concentration of sodium pyrosulfite or the pH of the waste water. The treated waste water is clear, single phase with no precipitates or turbidity, has a pH of about 6.5 and is safe to dispose of from the batch vessel into a sanitary sewer drain or the like. The method is a substantial improvement over the prior art and exhibits no off-gassing of toxic fumes such as sulfur dioxide or the like.

EXAMPLE II

The method of Example I is followed, except that 3 gallons of a waste water containing 4 weight percent of glutaraldehyde is substituted for the formaldehyde-containing waste waster of Example I. Moreover, the amount of sodium pyrosulfite added to the batch vessel is 2271 gm. and the buffer is trisodium phosphate added to the batch vessel in an amount of 204 gm. The reaction proceeds rapidly to completion within about 15 minutes in accordance with the following:

3 $HCO\ (CH_2)_3\ CHO + 4\ Na_2S_2O_5$ + buffer yields $Na_2C_5H_{10}S_2\ O_8$ is pentane disulfuric acid sodium salt + $Na_2C_5H_8S_2O_6$ which is 2-pentene-4 ene disulfuric acid sodium salt + $Na_2C_5H_{10}S_2O_8$ which is disodium 1, 5 dihydroxyl pentane disulfite + $Na_2SO_4$ which is sodium sulfate plus other chemical species.

The reaction reduces the glutaraldehyde concentration in the waste water to below about 30 parts per million and the treated waste water has a final pH of about 6.5. The treated waste water is then safely decanted into a sewer line for disposal.

Further aspects of the present method are set forth in the foregoing. Various modifications, changes, alterations and additions can be made in the present method, its steps and parameters. All such modifications, changes, alterations and additions as are within the scope of the appended claims form part of the present invention.

What is claimed is:

1. An improved method of neutralizing aldehyde-containing liquid waste streams, said method consisting of the steps of:
   a) as a first step, contacting an aqueous aldehyde-containing body of waste liquid with a treating agent which consists only of sufficient sodium pyrosulfite having the formula $Na_2S_2O_5$ to substantially completely neutralize the aldehyde in said body, said body and said treating agent being devoid of sodium sulfite and sodium bisulfite, the latter having the formula $NaHSO_3$;
   b) maintaining said contact until said substantially complete neutralization is effected; and,
   c) thereafter disposing of said neutralized detoxified body of waste liquid.

2. The improved method of claim 1 wherein said contacting is maintained for at least about 15 minutes.

3. The improved method of claim 2 wherein said contacting is effected in the presence of a non-reactive buffer and wherein said treated body of waste water has a pH of about 6–11.

4. The improved method of claim 3 wherein said treated body of waste liquid has a pH of about 7 and wherein no separate pH adjustment step is carried out during said method, 5. The improved method of claim 2 wherein said contacting is maintained while agitating said body to assure complete neutralization.

6. The improved method of claim 1 wherein said aldehyde is formaldehyde and wherein said neutralization is effected in accordance with the following reaction:

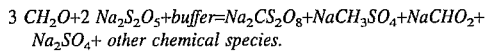

7. The improved method of claim 1 wherein said aldehyde is glutaraldehyde and wherein said neutralization is effected in accordance with the following reaction:

$3HCO(CH_2)_3CHO + 4Na_2S_2O_5 + \text{buffer} = Na_2C_5H_{10}S_3O_8 +$ $Na_2SO_4 + Na_2C_5H_8S_2O_6 + Na_2C_5H_{10}S_2O_8 +$ other chemical species.

* * * * *